(12) United States Patent
Lawrence et al.

(10) Patent No.: US 10,544,888 B2
(45) Date of Patent: *Jan. 28, 2020

(54) CRIMP CONNECTION WITH ONE OR MORE CRIMPING ELEMENTS

(71) Applicant: NIBCO Inc., Elkhart, IN (US)

(72) Inventors: Benjamin L. Lawrence, Elkhart, IN (US); David A. Bobo, Granger, IN (US); Christopher W. Mason, Granger, IN (US); Keith W. Yoder, Syracuse, IN (US); Paul Frische-Mouri, Osceola, IN (US); Justin J. Carey, South Bend, IN (US)

(73) Assignee: NIBCO Inc., Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,964

(22) Filed: Feb. 25, 2019

(65) Prior Publication Data

US 2019/0186660 A1  Jun. 20, 2019

Related U.S. Application Data

(63) Continuation of application No. 15/284,923, filed on Oct. 4, 2016, now Pat. No. 10,240,698.

(60) Provisional application No. 62/296,406, filed on Feb. 17, 2016, provisional application No. 62/325,106, filed on Apr. 20, 2016.

(51) Int. Cl.
 *F16L 13/14* (2006.01)
(52) U.S. Cl.
 CPC .................. *F16L 13/142* (2013.01)
(58) Field of Classification Search
 CPC ................ F16L 13/141; F16L 13/142

USPC .................. 285/382, 382.1, 382.7
See application file for complete search history.

(56) References Cited

U.S. PATENT DOCUMENTS

| | | |
|---|---|---|
| 2,201,372 A | 5/1940 | Miller |
| 3,149,861 A | 9/1964 | Larsson |
| 3,244,441 A | 4/1966 | Caudle |
| 3,477,750 A | 11/1969 | Powell |
| 3,596,939 A | 8/1971 | Gibson |
| 3,632,141 A | 1/1972 | Larsson |
| 3,675,949 A | 7/1972 | Dawson |
| 4,018,462 A | 4/1977 | Saka |
| 4,130,302 A | 12/1978 | Mitchell et al. |
| 4,150,466 A | 4/1979 | Horvath |
| 4,249,340 A | 2/1981 | Maes, Jr. |
| 4,277,091 A | 7/1981 | Hunter |

(Continued)

FOREIGN PATENT DOCUMENTS

| | | |
|---|---|---|
| EP | 511257 | 8/1939 |
| JP | 56009025 | 1/1981 |

(Continued)

OTHER PUBLICATIONS

PCT Search Report and Written Opinion for PCT/US2016/058150 dated Feb. 9, 2017.

*Primary Examiner* — Aaron M Dunwoody
(74) *Attorney, Agent, or Firm* — Price Heneveld LLP (57) ABSTRACT

A crimp connection fitting includes a socket with at least one annular recess axially spaced from an annular O-ring receiving groove. The recess includes a plurality of axially spaced crimping elements such that, when the socket is crimped, it grips a conduit positioned within the socket. The crimping elements preferably are split ring spring clips. In some embodiments, multiple spaced recesses support one or more crimping elements.

20 Claims, 9 Drawing Sheets

(56) References Cited

U.S. PATENT DOCUMENTS

| | | |
|---|---|---|
| 4,328,982 A | 5/1982 | Christianson |
| 4,850,096 A | 7/1989 | Gotoh et al. |
| 4,880,260 A | 11/1989 | Gotoh et al. |
| 4,964,657 A | 10/1990 | Gonzales |
| 5,007,667 A | 4/1991 | Unewisse et al. |
| 5,080,406 A | 1/1992 | Hyatt et al. |
| 5,108,134 A | 4/1992 | Irwin |
| 5,150,519 A | 9/1992 | Unewisse |
| 5,484,174 A | 1/1996 | Gotoh et al. |
| 5,590,914 A | 1/1997 | Platner et al. |
| 6,059,338 A | 5/2000 | Diederichs |
| 6,131,956 A | 10/2000 | Foering et al. |
| 6,224,114 B1 | 5/2001 | Franzen et al. |
| 6,241,290 B1 | 6/2001 | Foering et al. |
| 6,427,309 B1 | 8/2002 | Viegener |
| 6,581,983 B1 | 6/2003 | Viegener |
| 6,619,701 B1 | 9/2003 | Udhofer |
| 6,805,385 B2 | 10/2004 | Viegener |
| 6,874,823 B2 | 4/2005 | Viegener |
| 7,201,382 B2 | 4/2007 | Viegener |
| 7,316,429 B2 | 1/2008 | Viegener |
| 7,658,419 B2 | 2/2010 | Viegener et al. |
| 7,954,861 B2 | 6/2011 | Swift et al. |
| 8,533,926 B2 | 9/2013 | Holmes, IV et al. |
| 8,585,100 B2 | 11/2013 | Stults et al. |
| 9,249,907 B2 | 2/2016 | Mester |
| 9,523,451 B1 | 12/2016 | Nichols |
| 2011/0204624 A1 | 8/2011 | Lawrence |
| 2013/0119655 A1 | 5/2013 | Jamison |
| 2014/0197633 A1 | 4/2014 | Nixon |
| 2015/0285420 A1 | 10/2015 | Stout |
| 2015/0354737 A1 | 12/2015 | Stout |

FOREIGN PATENT DOCUMENTS

| | | |
|---|---|---|
| JP | 56009026 | 1/1981 |
| WO | 9110611 | 7/1991 |
| WO | 2011025768 | 3/2011 |

CRIMP CONNECTION WITH ONE OR MORE CRIMPING ELEMENTS

CROSS-REFERENCE TO RELATED APPLICATIONS

The present application is a continuation of claims priority under claims priority under 35 U.S.C. § 120 to commonly assigned, U.S. application Ser. No. 15/284,923, filed Oct. 4, 2016, now U.S. Pat. No. 10,240,698, issued Mar. 26, 2019, entitled CRIMP CONNECTION WITH ONE OR MORE CRIMPING ELEMENTS, which claims the priority benefit under 35 U.S.C. § 119(e) to U.S. Provisional Application Nos. 62/296,406 entitled CRIMP CONNECTION WITH CENTERED CRIMPING ELEMENT, filed on Feb. 17, 2016, and 62/325,106 entitled CRIMP CONNECTION WITH ONE OR MORE CRIMPING ELEMENTS, filed on Apr. 20, 2016, the entire disclosures of which are incorporated herein by reference.

BACKGROUND OF THE INVENTION

The present invention relates to tubular plumbing components or fittings and particularly to a socket having one or more recesses, each with one or more crimping elements for securing conduits by crimping to the plumbing fitting.

As the plumbing industry evolves, the use of soldered copper pipe connections is becoming less prevalent in favor of lead-free plumbing systems employing modern mechanical quick-connections. These connections typically require different tools and skills for connecting fittings, such as valves, tees, elbows, and the like, to corresponding tubing, be it copper, steel, or other metallic piping material. There exists a variety of push-type connections, crimp connections, and press connections, all of which use different types of tools and plumbing skills for making connections in a plumbing system.

It has been discovered that different diameter plumbing fittings and, in particular, crimped fittings may require different crimping element designs. As such, ½"-1" fittings may be able to use one crimping design, 2"-3" fittings may require an entirely different design, and fittings larger than 3" may require yet another design. One goal of this invention is to provide a crimp fitting design that can accommodate different sized plumbing fittings. Thus, this invention provides crimp connections (also known as press joints), for coupling conduits to plumbing fittings to provide secure mechanical and water-tight connections for different sized plumbing fittings which are relatively inexpensive, easy to install, and reliable in long term service.

SUMMARY OF THE INVENTION

The crimp connection design of the present invention accommodates this need by providing a socket which includes at least one annular recess adjacent a circumferential O-ring receiving groove. The recess includes two or more crimping rings or crimping elements, depending on the size of the fitting, which are positioned in the recess such that, when the socket is crimped, it enhances the gripping of the crimped area to a conduit positioned within the socket.

In one embodiment, two or more crimping rings are positioned in the annular recess to increase the griping force of the crimping ring or rings to a conduit inserted into the socket and subsequently crimped. The number of crimping rings employed can vary in numbers depending upon the size of the plumbing fitting. In another embodiment of the invention, the annular recess includes a centered radially inwardly extending projection which itself engages and secures the connection of a conduit placed in the socket upon crimping.

In many embodiments of the invention, an annular recess with a crimping element is located on opposite sides of the annular O-ring receiving recess. In each of the embodiments, the socket can be manufactured of any number of copper and copper alloys, lead-free alloys, carbon steel or stainless steel alloys, or leaded brass/bronze. The socket can be incorporated into fittings, such as valves, tees, elbows, connectors, and the like. Manufacturing costs can be greatly reduced since they employ common tooling, assembly techniques, and manufacturing processes for their manufacturing. Also, assembly in the field requires only standard crimping tools and no special plumbing skills.

These and other features, objects and advantages of the present invention will become apparent upon reading the following description thereof together with reference to the accompanying drawings.

DETAILED DESCRIPTION OF THE PREFERRED EMBODIMENT

For purposes of description herein, the terms "upper," "lower," "right," "left," "rear," "front," "vertical," "horizontal" and derivatives thereof shall relate to the invention as oriented in FIGS. 1-11. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
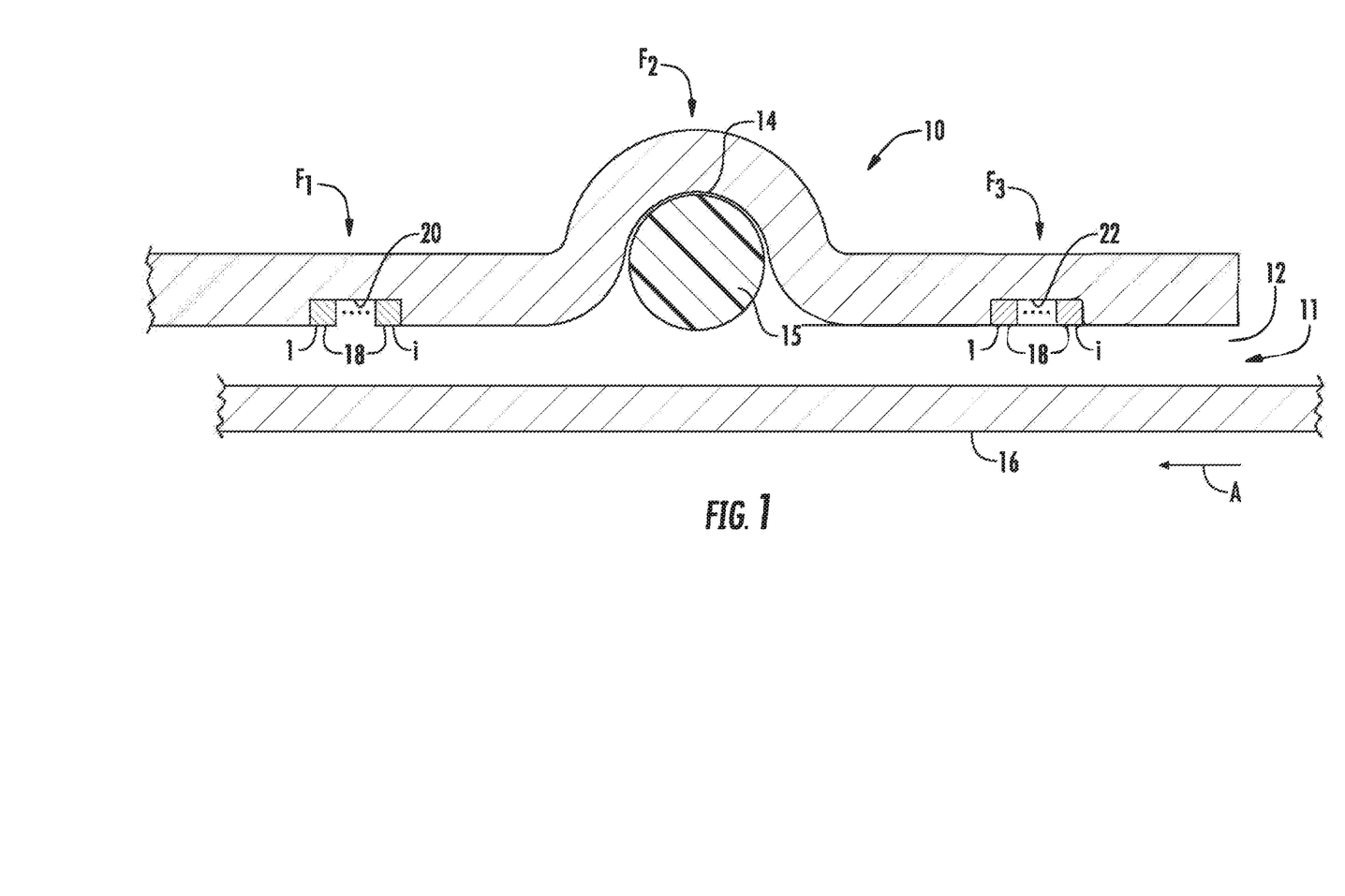
FIG. 1 is a fragmentary cross-sectional exploded view of one-half a fitting and conduit of a first embodiment of the present invention, it being understood that the cylindrical fitting is symmetrical and includes a mirror image lower half as in several of the remaining drawing figures.
Figure 4:
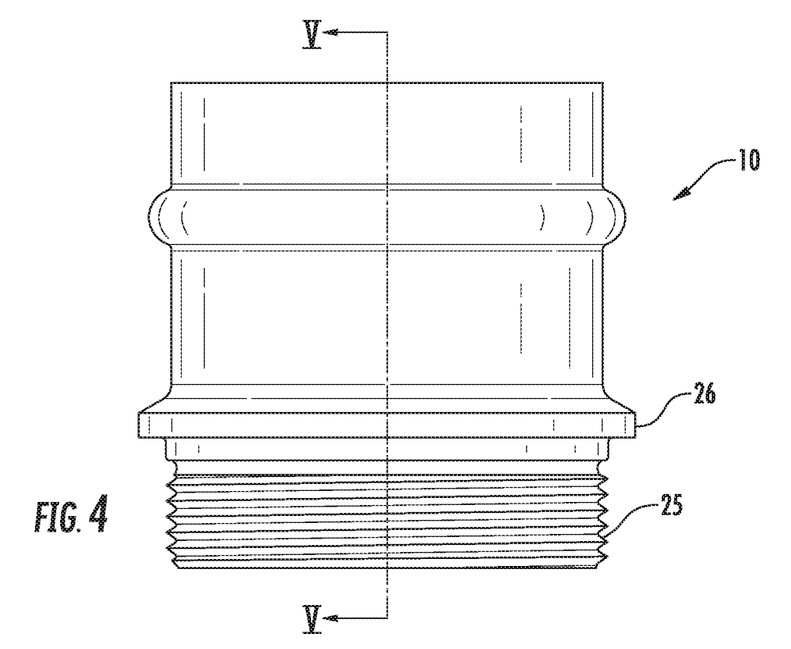
FIG. 4 is a side elevational view of a fitting including one embodiment of the present invention.
Figure 5:
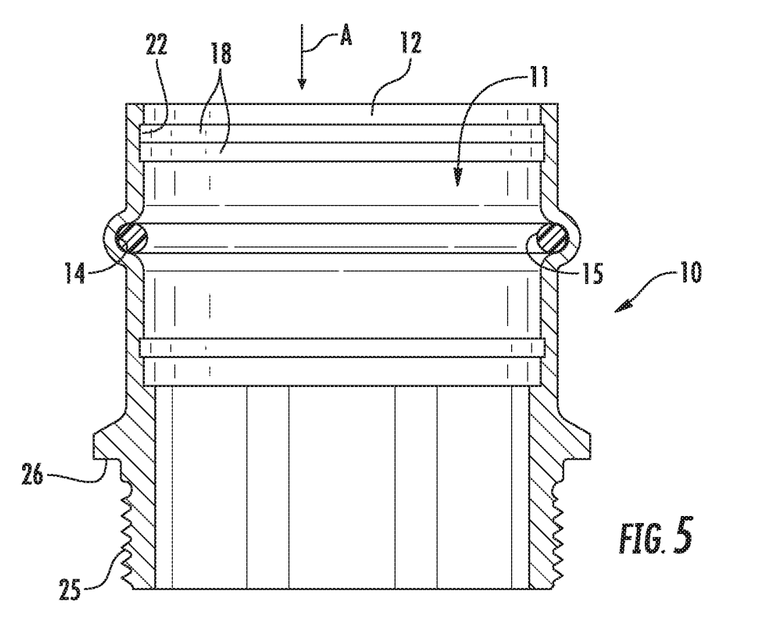
FIG. 5 is a cross-sectional view of the fitting shown in FIG. 4, taken along section line V-V.
Figure 6:
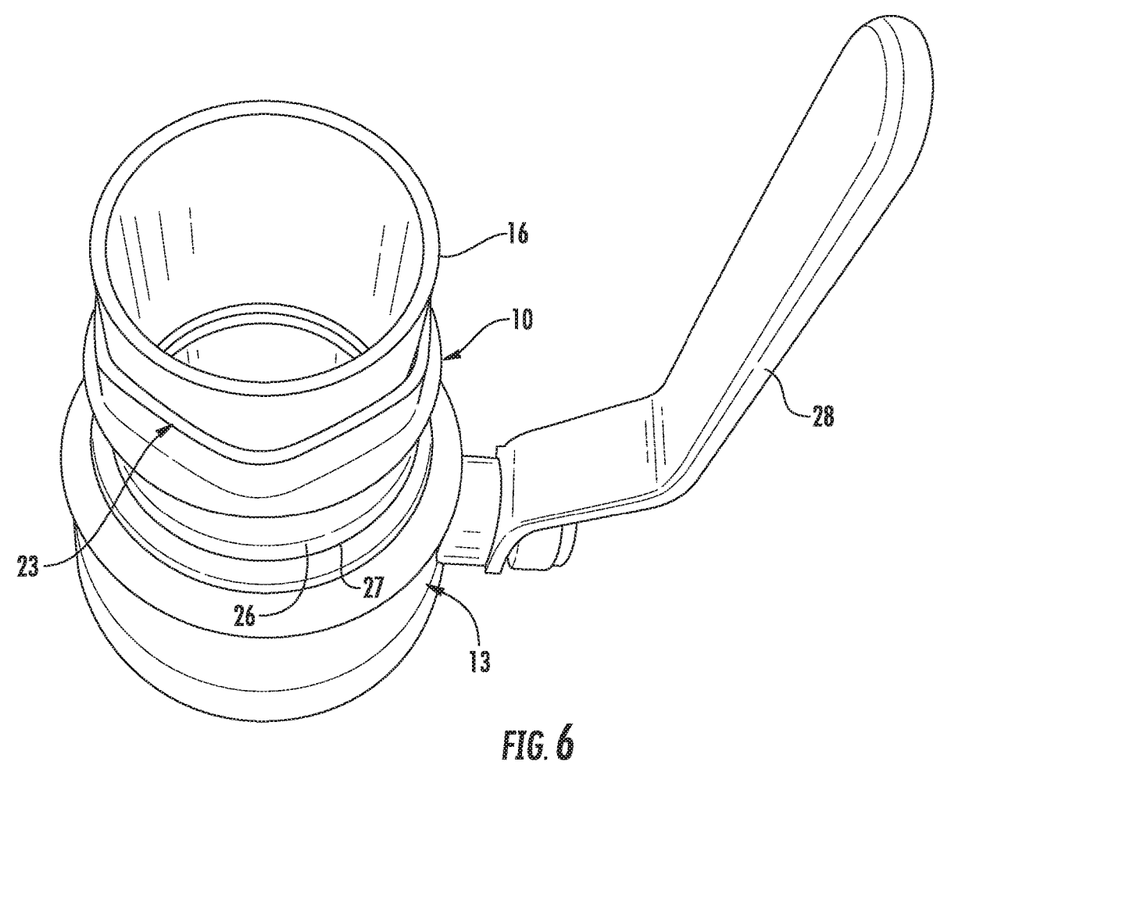
FIG. 6 is a perspective view, partly broken away, of a conduit coupled to a valve using the crimp fitting shown in FIGS. 4-5.

Referring initially to FIGS. 1 and 4-7, there is shown a fitting 10, which can be any type of plumbing fitting such as a coupling, valve, tee-fitting, elbow, or the like, for providing a sealed crimp or press-fit coupling between the fitting and a conduit 16 coupled to the fitting. As seen in FIG. 6, the fitting 10 couples a conduit 16 to a valve 13. This invention can, however, be applied in other areas, such as soft joinery materials that require support and mechanical strength, including weldments in which press joinery is subject to the heat affected zone of the weld or large tubular products that are inherently in a soft condition due to impact of relatively slow solidification cooling of a metal from a molten state which is encountered with large mass. The fitting 10 in FIG. 1 is shown as one half of the fitting, it being understood that it is cylindrical with a mirror image lower half, as seen in FIGS. 4-6. FIGS. 8-11 also show alternative embodiments as one half of the fittings shown.

The fitting 10 can be made from numerous materials, which can be cast, forged, cold-formed, or machined. Such materials include, but are not limited to, the following (noting that "x" can represent any number from 0 to 9):
1) 10xx Non-resulfurized Carbon Steel Grades (Plain Carbon Steel)
2) 11xx Resulfurized Carbo Steel Grades (Free-Carbon Steel)
3) 13xx Manganese Steels
4) 20xx Nickel Steels
5) 30xx, 31xx, 33xx Nickel-Chromium Steels
6) 40xx Molybdenum Steels
7) 41xx Chromium-Molybdenum Steels
8) Monels (Nickel-Based Copper Alloys)
9) High Purity Coppers
10) Phosphorus DEOX Copper
11) Red Brass
12) Semi-Red Brass
13) Yellow Brass
14) Bronze Fitting 10 includes an open end 12 defining a socket 11 (FIGS. 1 and 5) with an internal annular O-ring receiving groove 14 spaced from end 12 a distance sufficient for the insertion and crimping of a tube, such as conduit 16 shown in FIGS. 1 and 6. An O-ring 15 is inserted in the annular groove 14 for fluid sealing the connection once crimped. Spanning opposite sides and spaced from the annular groove 14 in one of the embodiments of the invention are a pair of annular recesses 20 and 22 with each recess including axially spaced crimping elements, such as split ring spring clips 18. In many if not most installations, only one recess 22 with split ring spring clips 18 is necessary. The recess 22 is located upstream of the flow of fluid relative to the O-ring seal 15.

Crimping elements, such as split ring spring clips 18, depending on the diameter of fitting 10 and conduit 16, can be any number of split ring spring clips numbered 1-i in FIG. 1, where i can be 2-5 or higher depending on the diameter of fitting 10. Thus, for example, a 3" valve fitting 10 may include three or more split ring spring clips 18 of the type shown in FIGS. 2 and 3. The split ring spring clips 18 can be employed in the embodiment shown in FIG. 1 in recesses 22 or 20 or both, with each of the various embodiments of the invention using from one to four or more identical split ring spring clips 18.

Figure 2:
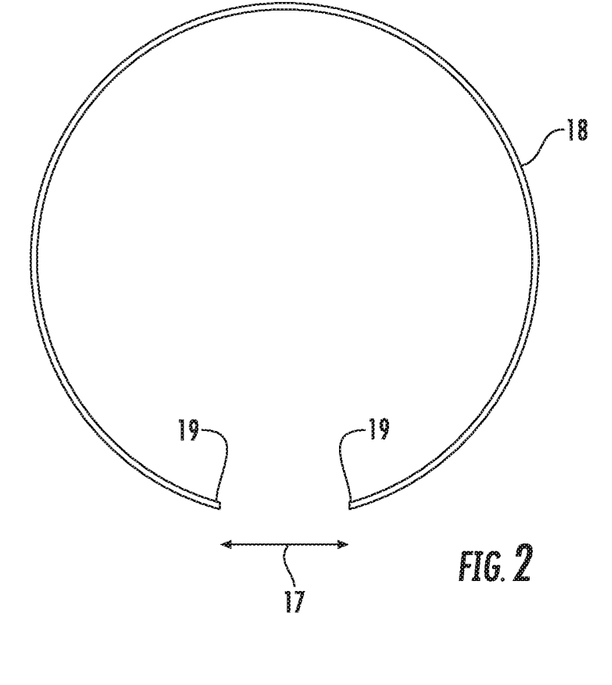
FIG. 2 is a front elevational view of a split ring spring clip which can be used in the embodiment of FIG. 1 or those of FIGS. 4-5.
Figure 3:
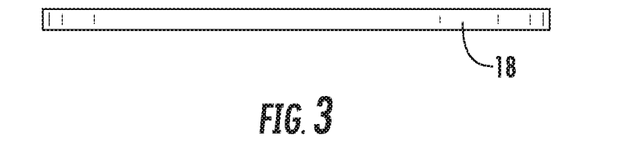
FIG. 3 is a top plan view of the split ring spring clip shown in FIG. 2.
Figure 7:
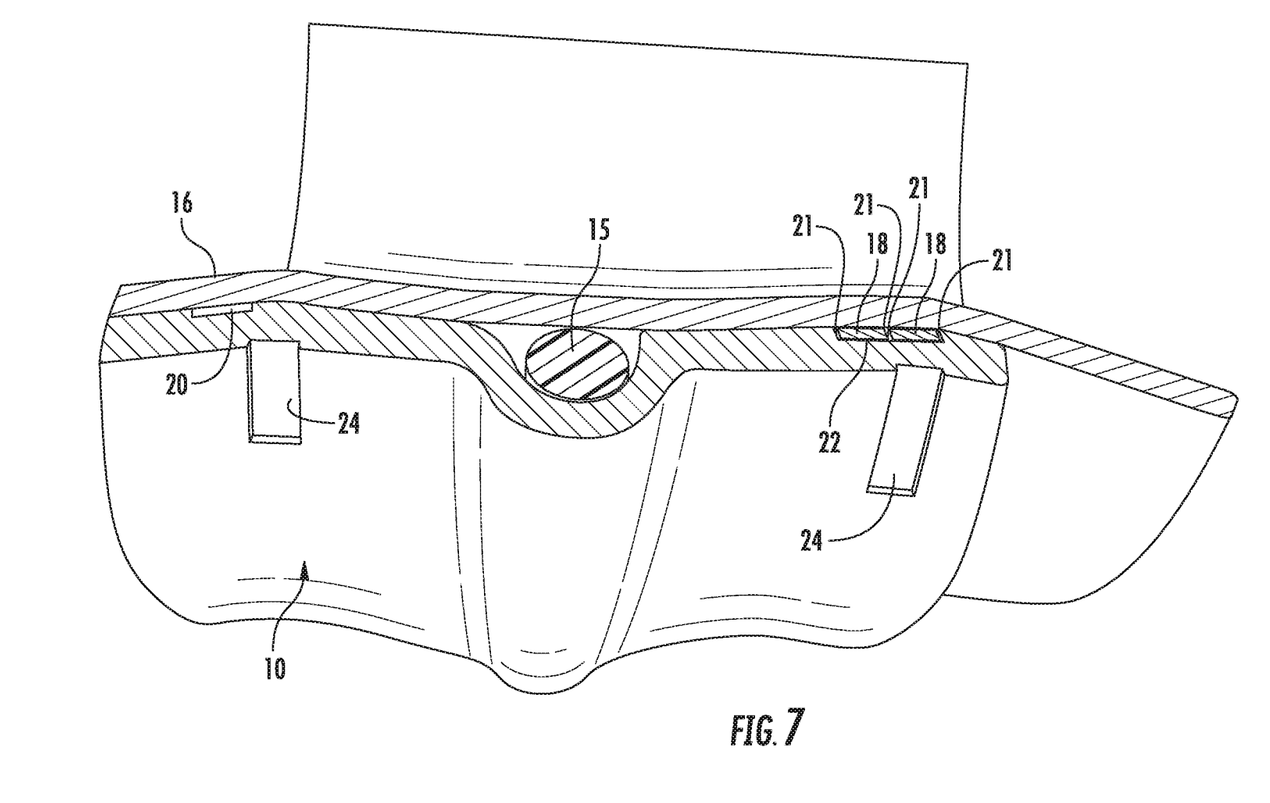
FIG. 7 is an enlarged fragmentary perspective view showing the split ring spring clips and seal resulting in the sealed crimped coupling between the conduit and the fitting shown in FIG. 6.

Each of the split ring spring clips, as seen in FIGS. 1-3, have a gap 17 between facing ends 19 of the generally circular (as viewed in FIG. 2) split ring spring clips 18 to allow compression of the split ring spring clips sufficient to be inserted into the circular recesses 20 and 22 and subsequently crimped. The dimensions of split ring spring clips 18 and recesses 20, 22 are selected depending upon the diameter of the fitting 10 to provide, when compressed, a tight mechanical connection to the outer surface of conduit 16 inserted into the open end 12 defining a socket 11 of fitting 10, as seen in FIG. 7. The material of split ring spring clips 18 can be stainless steel or a copper and brass alloy when used on the inside of recess 20 of fitting 10. For the outside recess 22, which is not exposed to the flow of fluid within conduit 16 due to the sealing O-ring 15, spring steel, carbon steel, or other materials can be employed for split ring spring clips 18, although stainless steel or copper/brass alloys can likewise can be used.

In the fitting 10 shown in FIGS. 1 and 4-7, the flow of fluid is in the direction indicated by arrow A in FIGS. 1 and 5. The crimping forces $F_1$ and $F_3$ are applied to the areas aligned with the split ring spring clips 18, while force $F_2$ compresses O-ring 15 to provide a watertight seal. The forces $F_1$-$F_3$ are applied by a conventional crimping tool having a pair of jaws, each with three crimping elements, resulting in six crimped indentations 24 (FIG. 7) spaced around the fitting at each axially spaced crimping area (i.e., recesses 20, 22 and annular groove 14). This results in a somewhat hexagonal end 23 of fitting 10 once crimped to conduit 16 and threaded within valve 13, as best seen in FIG. 6. For such purpose, fitting 10, as seen in FIGS. 4 and 5, has a threaded end 25 with a shoulder 26 which engages the valve 13 and is sealed thereto by an appropriate seal positioned between the shoulder 26 and the threaded receiving end 27 (FIG. 6) of valve 13. Valve 13 can be a conventional ball valve or other type of valve, including a control handle 28, for opening and closing the valve. Fitting 10 likewise can couple conduit 16 to any other type of plumbing fitting and may have a coupling other than threaded end 25 for such purpose.

Raised areas or beads 18', such as shown in the FIGS. 8-11 embodiments, can be provided on the coupling shown in FIGS. 1-7 to increase the compressive force on the split ring spring clips 18 and to assist in aligning the crimping tool. Other indicia, such as screen printed indicia in the area of $F_1$ and $F_3$, aligned with the recesses 20, 22, likewise could be provided to assist in indexing the crimping tool. When crimping forces $F_1$ and $F_3$ are applied to these areas, split ring spring clips 18 will engage and mechanically couple fitting 10 to conduit 16. In some embodiments, only one recess 22, typically on the upstream side of conduit 16 may be necessary. In the embodiment shown in FIG. 1, two recesses 20 and 22 are provided. The multiple crimping elements, such as split ring spring clips 18, enhance the forces $F_1$ and $F_3$ applied by a conventional crimping tool and, as noted above, the multiple split ring spring clips 18 enhance the mechanical connection of the fitting 10 to the conduit 16. During crimping, the split ring spring clips tend to skew, as illustrated in FIG. 7, such that the sharp corners 21 (FIG. 7) of the generally rectilinear split ring spring clips dig into the softer material of conduit 16 providing a secure mechanical connection of fitting 10 to conduit 16.

Figure 8:
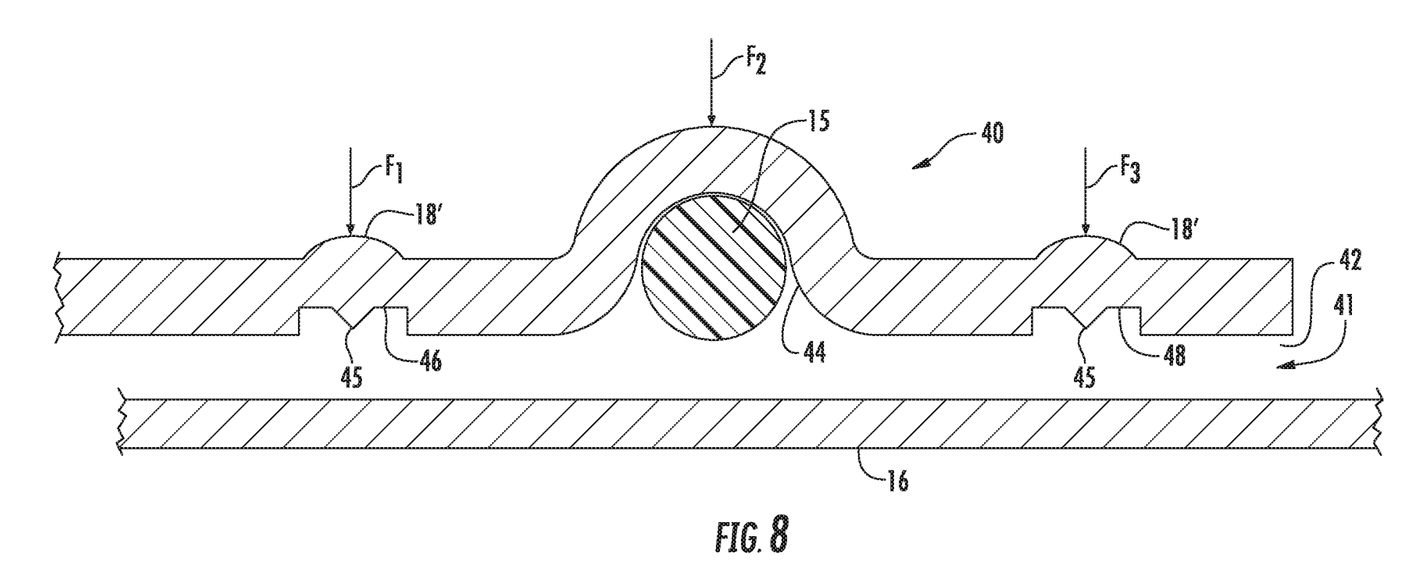
FIG. 8 is a fragmentary cross-sectional exploded view of a socket of a fitting of a second embodiment of the present invention.

Referring to FIG. 8, there is shown another fitting 40, which can be any type of plumbing fitting such as a coupling, valve, tee-fitting, elbow, or the like, for providing a press or crimp joint between the fitting and a conduit 16 coupled to the fitting. Fitting 40 includes an open end 42 defining a socket 41 with an internal annular O-ring receiving groove 44 spaced from end 42 a distance sufficient for the insertion and crimping of a tube, such as conduit 16. An O-ring 15 is inserted in the annular groove for sealing the connection once crimped. Spanning opposite sides and spaced from the annular groove 44 in one of the embodiments of the invention are a pair of annular recesses 46 and 48 with each recess including a centrally located crimping element 45.

Crimping elements 45 are triangular projections centrally located in recesses 47 and 48 and extending radially inwardly toward conduit 16. The crimping elements 45 may take on different shapes as long as they can be deflected during crimping to mechanically engage and secure conduit 16 to fitting 40. In order to assure proper crimping, fitting 40 may include indexing indicia, such as an external bead 18', which is aligned with recesses 46, 48 to facilitate positioning of the crimping tool to assure crimping forces are applied in alignment with the crimping elements. Other indexing indicia could likewise be used, such as a screen printed band surrounding the fitting and aligned with the crimping element. When crimping forces $F_1$ and $F_3$ are applied to these areas, the apexes of the triangular crimping elements 45 will engage and mechanically couple fitting 40 to conduit 16 while O-ring 15 provides a watertight seal. In some embodiments, only one recess 48, typically on the upstream side of conduit 16 may be necessary. The crimping elements 45 enhance the forces $F_1$ and $F_3$ applied by a conventional crimping tool to enhance the mechanical connection of the fitting 40 to the conduit 16.

Figure 9:
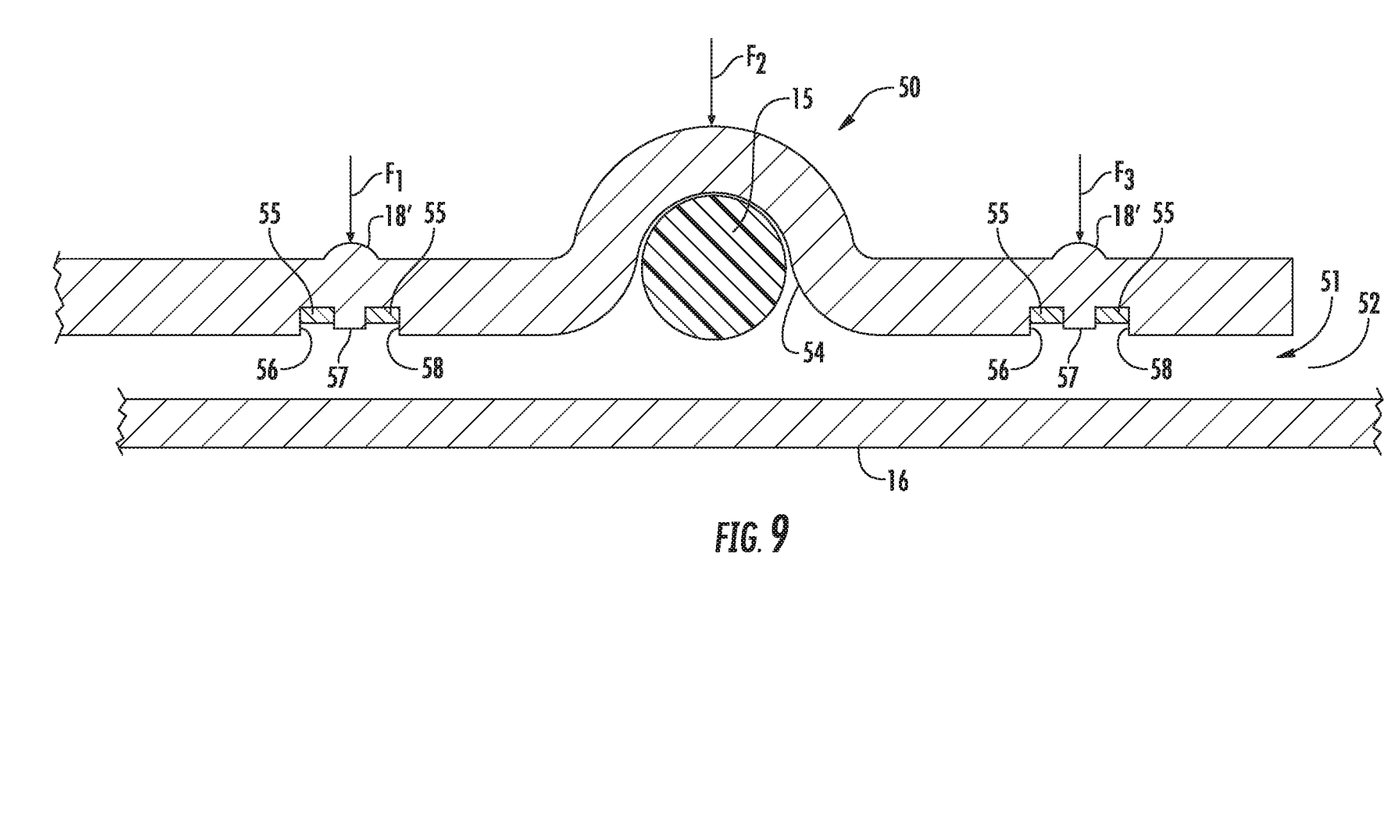
FIG. 9 is a fragmentary cross-sectional exploded view of a socket of a fitting incorporating a third embodiment of the present invention.

Referring now to FIG. 9, a fitting 50 includes an open end 52 defining a socket 51 with an internal annular O-ring receiving groove 54 spaced from end 52 a distance sufficient for the insertion and crimping of a tube, such as conduit 16. An O-ring 15 is inserted in the annular groove for sealing the connection once crimped. Spanning opposite sides and spaced from the annular groove 54 are pairs of annular recesses 56 and 58 with each recess including a crimping element 55. The fitting 50 also includes indexing indicia 18' for aligning the crimping tool with the crimping elements.

In the embodiment shown, an additional crimping element 57 is a generally rectangular member extending radially inwardly (i.e., toward the longitudinal axis of the fitting) from the bottom of recesses 56 and 58 toward the surface of conduit 16. The crimping element 57 divides the recesses 56 and 58 into two channels, each of which receives split ring spring clips 55. The split ring spring clips can be slightly wider than the width of each of the recesses 56 and 58, such that they tend to extend outwardly prior to crimping. When the crimping force indicated by arrows $F_1$, $F_2$, and $F_3$, is applied to the fitting 50, the corners of each of the split ring spring clips 55 engage and mechanically secure conduit 16 within the socket 51 defined by the open end 52 of fitting 50. Split ring spring clips 55 are preferably made of a material, such as stainless steel, that is noncorrosive and sufficiently hard to engage and dig into the material of conduit 16. Optimum grip potential is achieved between the "biting" edge of each of the split ring spring clips and the attached conduit 16 due to a perfect or near perfect alignment of the clip edges and the crimp deformation. The centering of the split ring spring clip edges at the point of greatest deformation results in an angling of the ring clips and digging into the conduit 16; thereby, increasing the hold on the conduit. The placement of split ring spring clips on both sides of the central crimping element 57 helps support the annular recess by directing force to the walls of the recess. Without the supportive split ring spring clips, crimp distortion could result in both shear and tensile forces on the connection body material.

Figure 10:
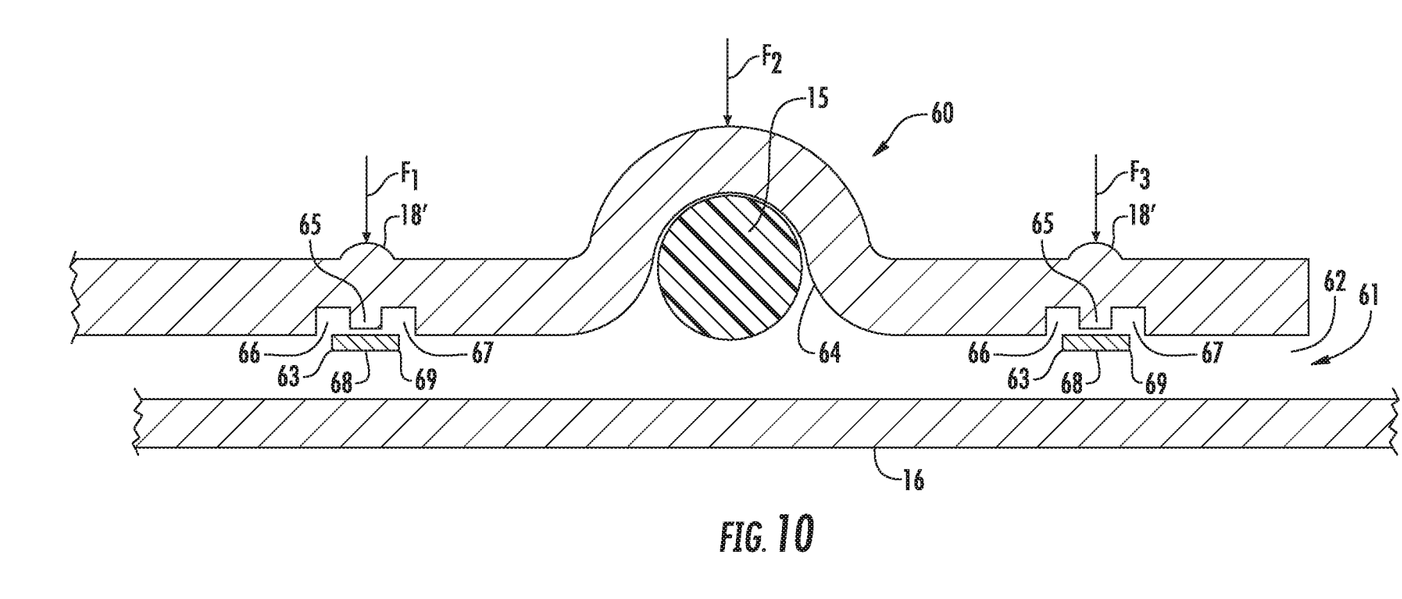
FIG. 10 is a fragmentary cross-sectional exploded view of another embodiment of a socket of a fitting embodying the present invention.

Referring now to FIG. 10, there is shown an alternative embodiment of the present invention in which a fitting 60 is crimped to a conduit 16. Fitting 60, as in the other embodiments, includes an open end 62 defining a socket 61 and an annular groove 64 for receiving an O-ring 15 to seal the connection between the fitting 60 and conduit 16 positioned within socket 61. Fitting 60 includes pairs of spaced annular recesses 66 and 67 on either side of and spaced from the groove 64. A crimping element 65 of substantially the same configuration as element 57 in the prior embodiment shown in FIG. 9, namely, a generally rectangular member extends from the floor of each of recesses 66 and 67 radially inwardly toward the outer wall of conduit 16. In this embodiment, however, relatively flat rectangular split ring spring clips 68 are employed and aligned with the crimping elements 65 in each of the recesses 66 and 67. They need not be aligned perfectly and the width of split ring spring clips 68, which are slightly less than the width of combined recesses 66 and 67 but wider than the crimping elements 65. The fitting 60 also includes indexing indicia 18' for aligning the crimping tool with the crimping elements 65. When crimped, the crimping element 65 tends to move the split ring spring clips 68 in a tilted fashion, such that one of the edges 63 or 69 dig into the outer surface of conduit 16. Alternatively, if the split ring spring clips 68 are perfectly aligned under the crimping element, they will still form a tight mechanical connection between fitting 60 and conduit 16. With the width of the split ring spring clips 68 being somewhat less than the combined width of recesses 66 and 67, however, it is more likely that they will tilt and have one of the edges 63 or 69 dig into the outer surface of conduit 16. The placement of a single split ring spring clip 68 within the recesses and aligned on the crimping element 65 is intended to provide a means of applying force at the center of the split ring spring clip. This design affords the potential to utilize an intermediate or dissimilar mechanical strength material along the gripping interface. For example, a relatively soft copper split ring spring clip may to be used between a harder connection split ring spring clip member to gain a degree of galling not available with only the two members. Conversely, an intermediate split ring spring clip may be a hard material that grips two softer materials.

Figure 11:
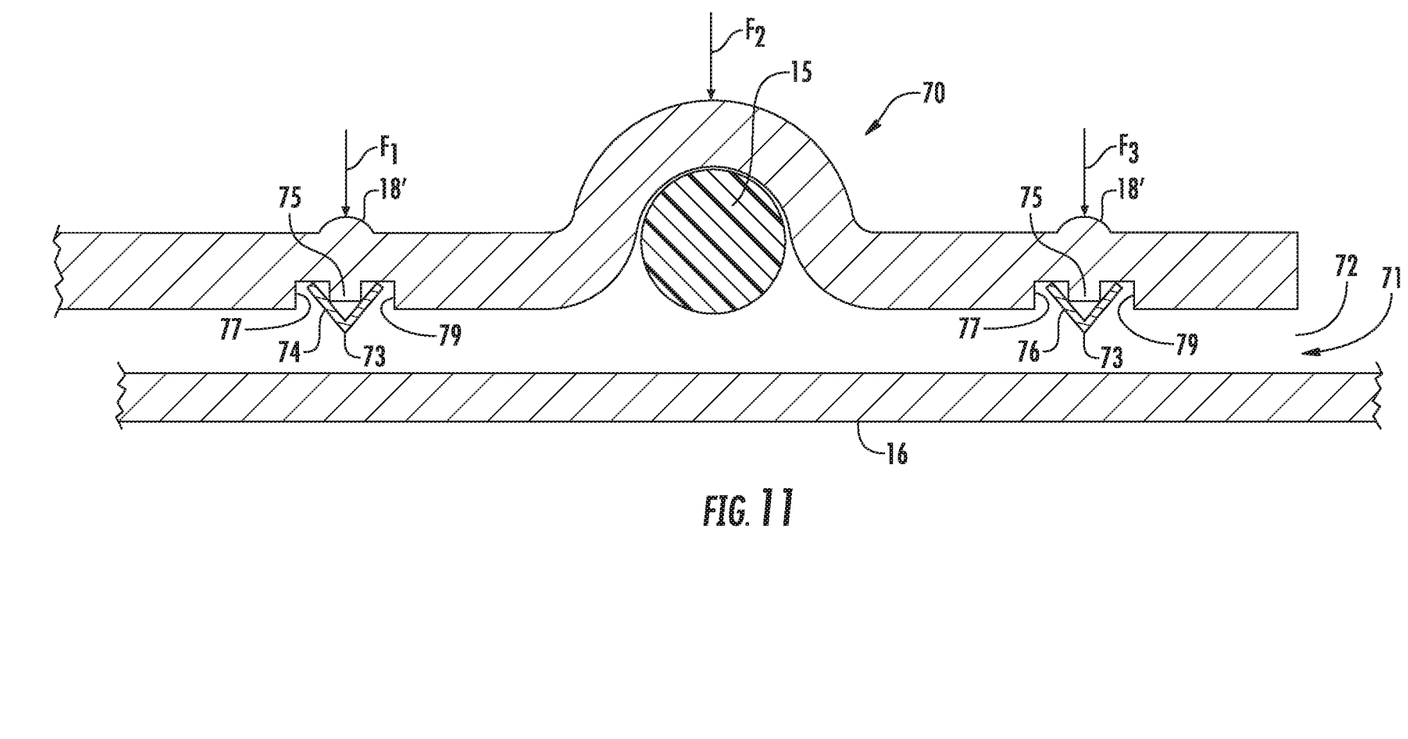
FIG. 11 is fragmentary cross-sectional exploded view of a further embodiment of a socket of a fitting embodying the present invention.

Finally, referring to FIG. 11, there is a fitting 70 which is substantially the same as fitting 50 in FIG. 9, except split ring spring clips 74 and 76 are generally V-shaped in cross section, having an apex 73 facing radially inwardly toward the outer surface of conduit 16. Fitting 70 includes an opening 72 defining a conduit receiving socket 71. Split ring spring clips 74 and 76, as in the other embodiments, are made of spring steel or other noncorrosive material, which has sufficient strength to engage and dig into the outer surface of conduit 16 when crimped by forces $F_1$ and $F_3$, as shown in FIG. 11. The fitting 70 also includes indexing indicia 18' for aligning the crimping tool with the crimping elements. The bases of the split ring spring clips 74 and 76 are somewhat smaller than the width of spaced-apart recesses 77 and 79, such that, when crimped with forces $F_1$ and $F_3$, the legs forming the triangular split ring spring clips 74 and 76 can spread slightly but are captively held by the outer edges of the recesses 77 and 79, such that the apex 73 of each of the split ring spring clips extend beyond the inner surface of the fitting 70 and are capable of digging into the outer surface of conduit 16. The dimensions can be varied somewhat but it is necessary for the crimping elements 75 to exert sufficient force on the split ring spring clips 74 and 76 to assure the apex 73 engages the outer surface of conduit 16 and preferably penetrate the outer surface slightly to provide a secure mechanical connection between the fitting 70 and conduit 16. The V-Shaped split ring spring clips 74, 76 provide for concentration of press force on the apex or "biting" edge 73 into the tube 16, thereby increasing the hold on the tube. The split ring spring clips in each embodiment have an overall appearance similar to that shown in FIGS. 2 and 3, with the exception of split ring spring clips 74 and 76 which are V-shaped in cross section.

It will become apparent to those skilled in the art that various modifications to the preferred embodiment of the invention as described herein can be made without departing from the spirit or scope of the invention as defined by the appended claims.

The invention claimed is:

1. A plumbing fitting with a socket for receiving a conduit for coupling to said fitting, said fitting comprising:
   an open end defining a socket for receiving a conduit, said socket including an annular groove for receiving a sealing ring;
   at least one annular recess spaced from said annular groove;
   a crimping element integrally formed in said annular recess and extending radially inwardly toward a conduit inserted into said socket; and
   wherein said crimping element divides said annular recess into at least two sections and a split ring spring clip is positioned in at least one of said sections.

2. The fitting as defined in claim 1, wherein said crimping element has a generally rectangular cross section.

3. The fitting as defined in claim 2, wherein said split ring spring clip has a generally rectangular cross section.

4. The fitting as defined in claim 1, wherein a split ring spring clip is positioned in each of said sections of said annular recess.

5. The fitting as defined in claim 4, wherein each of said split ring clips has a generally rectangular cross section.

6. The fitting as defined in claim 1, wherein said split ring clip is positioned in the section of the annular recess closest to said annular groove.

7. The fitting as defined in claim 1, wherein said split ring clip is positioned in the section of the annular recess furthest from said annular groove.

8. The fitting as defined in claim 1, further including indexing indicia on the outer surface of said fitting which is aligned with said crimping element.

9. The fitting as defined in claim 1, including at least two annular recesses.

10. The fitting as defined in claim 9, wherein each annular recess includes a crimping element.

11. The fitting as defined in claim 10, wherein each annular recess is on opposite sides of said annular groove.

12. A plumbing fitting with a socket for receiving a conduit for coupling to said fitting, said fitting comprising:
   an open end defining a socket for receiving a conduit, said socket including an annular groove for receiving a sealing ring;
   at least one annular recess spaced from said annular groove;
   a crimping element integrally formed in said annular recess and extending radially inwardly toward a conduit inserted into said socket; and
   wherein said crimping element divides said annular recess into at least two sections and a split ring clip positioned in alignment with said crimping element.

13. The fitting as defined in claim 12, wherein said crimping element is centered on said annular recess.

14. The fitting as defined in claim 12, wherein said split ring clip includes a portion with a width that is greater than the width of said crimping element but less than the width of said annular recess.

15. The fitting as defined in claim 12, wherein said crimping element is centered in said annular recess and is generally rectangular and has a width less than the width of said annular recess, and further including a split ring spring clip positioned in said annular recess in alignment with said crimping element, and wherein said split ring spring clip has a generally V-shaped cross section with diverging legs and is positioned with said legs spanning said crimping element.

16. The fitting as defined in claim 12 and further including indexing indicia on the outer surface of said fitting which is aligned with said crimping element.

17. A plumbing fitting with a socket for receiving a conduit for coupling to said fitting, said fitting comprising:
   an open end defining a socket for receiving a conduit, said socket including an annular groove for receiving a sealing ring;
   at least one annular recess spaced from said annular groove;
   a crimping element positioned in said annular recesses and extending radially inwardly; and
   wherein said crimping element divides said annular recess into at least two sections and further including at least one split ring spring clip, having a width greater than the width of each section of said annular recess, positioned in axial alignment with said crimping element.

18. The fitting as defined in claim 17, wherein said crimping element has a generally rectangular cross section.

19. The fitting as defined in claim 18, wherein said at last one split ring spring clip has a generally rectangular cross section.

20. The fitting as defined in claim 17, wherein said crimping element is centered in said at least one annular recess.

* * * * *